United States Patent [19]

Hager

[11] 4,203,466

[45] May 20, 1980

[54] NON-RETURN VALVE

[76] Inventor: Daniel Hager, Farges les Chalon, Chagny-Saone et Loire, France

[21] Appl. No.: 839,638

[22] Filed: Oct. 5, 1977

[30] Foreign Application Priority Data

Oct. 5, 1976 [FR] France ................................. 76 30676

[51] Int. Cl.[2] ............................................. F16K 15/06
[52] U.S. Cl. ..................................................... 137/543
[58] Field of Search ............ 137/536, 542, 543, 543.13, 137/533.19, 533.21, 533.23, 533.25, DIG. 3; 251/361

[56] References Cited

U.S. PATENT DOCUMENTS

| | | | |
|---|---|---|---|
| 558,034 | 4/1896 | Brown et al. ............... | 137/533.21 X |
| 937,773 | 10/1909 | Cunning ...................... | 137/533.21 X |
| 1,890,223 | 12/1932 | Kilzer ............................ | 137/543 X |
| 1,984,328 | 12/1934 | Bechtold ....................... | 137/543.23 |
| 2,673,062 | 3/1954 | Cornelius ..................... | 251/361 X |
| 2,943,639 | 7/1960 | Smith ............................ | 137/543 X |
| 2,949,928 | 8/1960 | Hobson ......................... | 137/542 X |
| 3,189,037 | 6/1965 | Callejo ......................... | 137/533.19 X |
| 3,474,808 | 10/1969 | Elliott ........................... | 137/543 |

*Primary Examiner*—William R. Cline
*Attorney, Agent, or Firm*—Irving M. Weiner; Pamela S. Burt; Melvin Yedlin

[57] ABSTRACT

A non-return valve having a guided obturator, guided at a stem portion and at a head portion within a guiding member situated within a chamber. The chamber has a shoulder portion which acts as a seat for the obturator head, and supports an annular flexible seal. The annular flexible seal is L-shaped, with a flexible lip which conforms to the contour of the edge of the obturator head. The obturator stem has a cruciform cross section.

12 Claims, 7 Drawing Figures

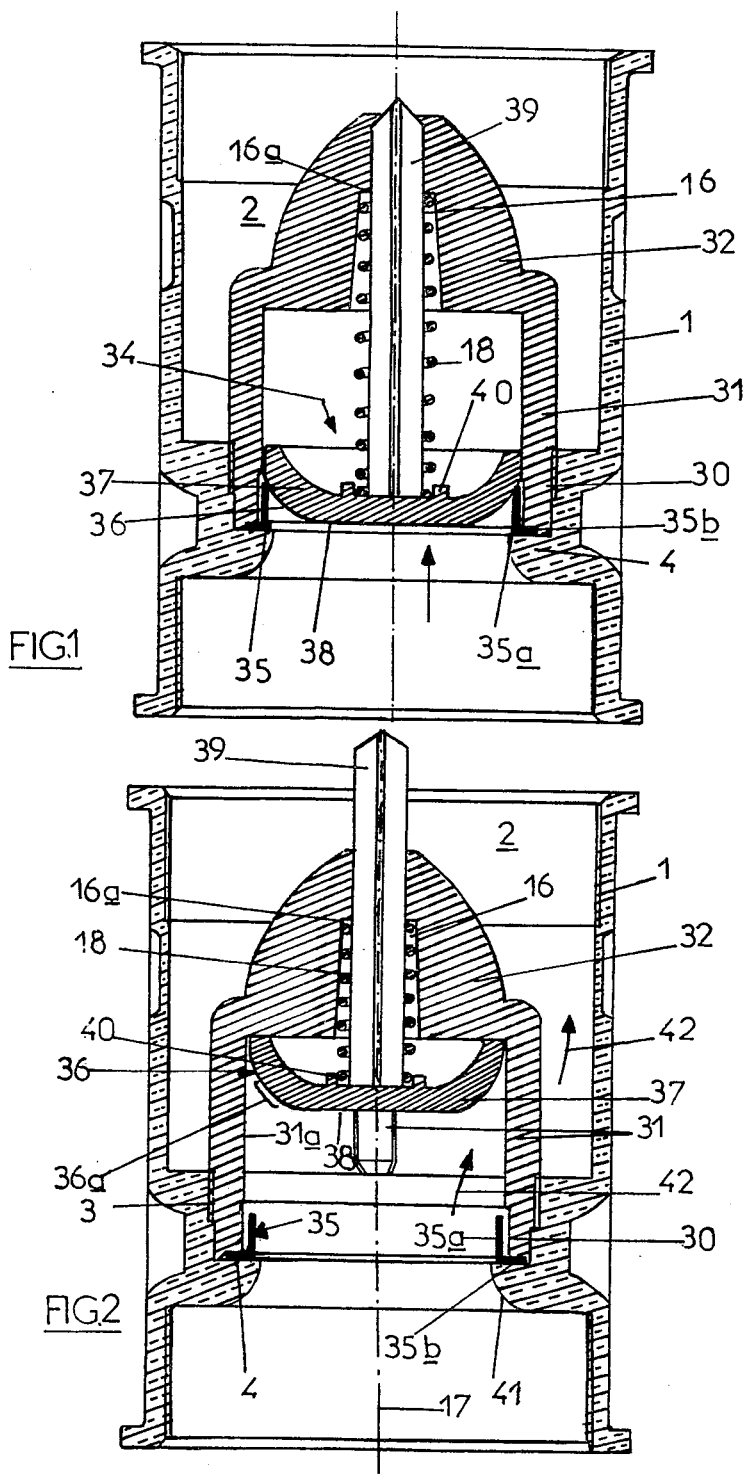

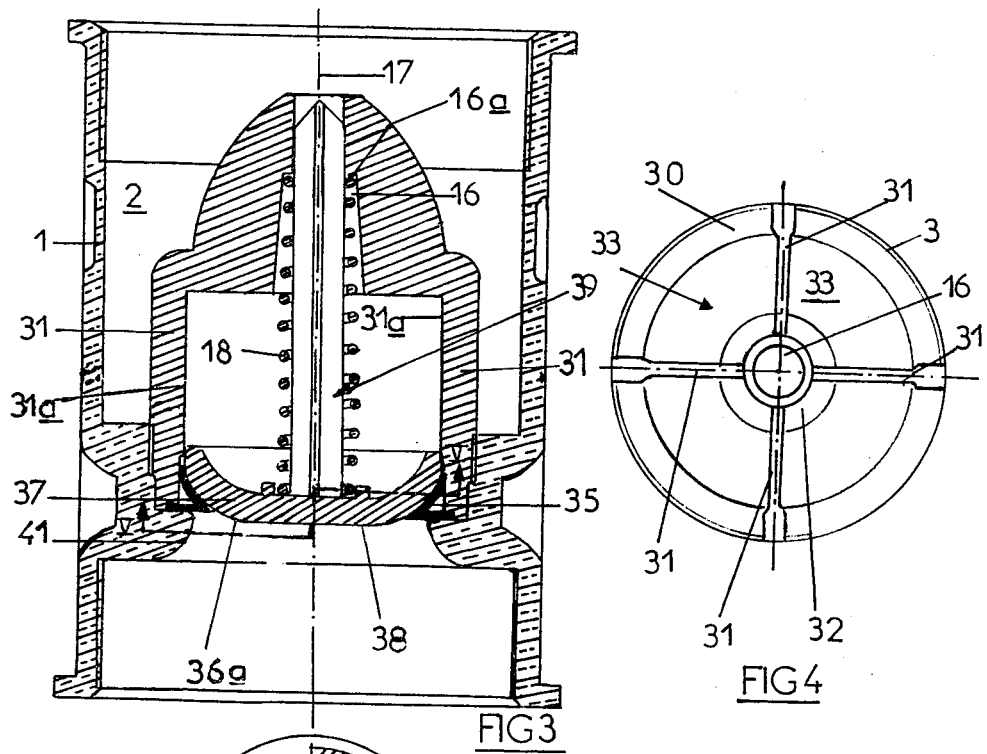
FIG.3
FIG.4
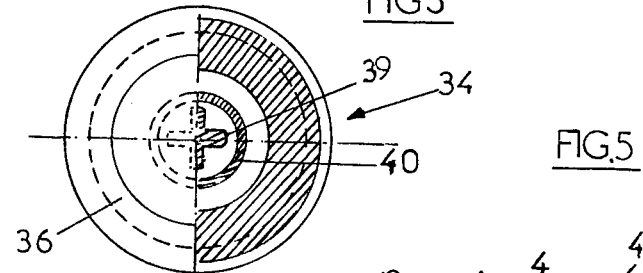
FIG.5
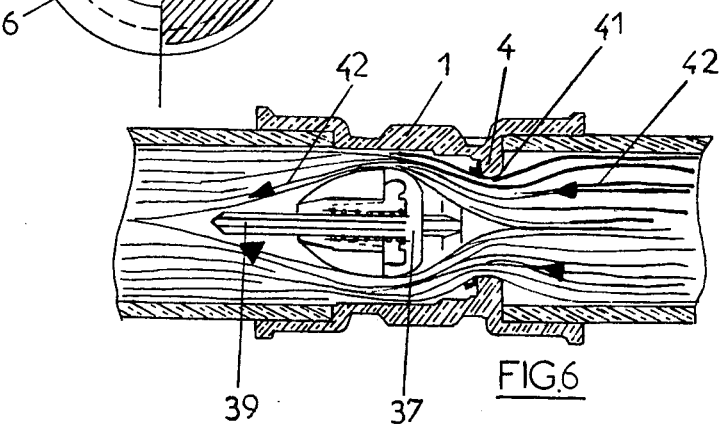
FIG.6

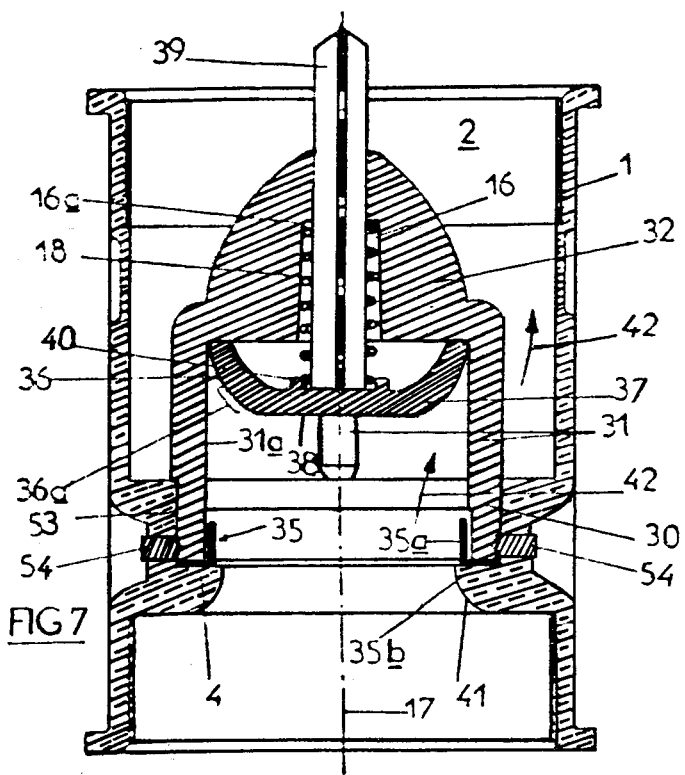

NON-RETURN VALVE

The present invention relates to a valve, that is intended to be used as an automatic non-return valve in a hydraulic pipe.

CROSS REFERENCES TO RELATED APPLICATIONS

The present application is based on French Patent Application No. 76 30 676 filed Oct. 5, 1976.

The prior art, in particular French Patent Application No. 7,323,809 and U.S. Pat. 3,995,658 concerned a non-return valve with an obturator within a chamber, this obturator being composed of a first half-shell guided by a second half-shell, connected by a cylinder of revolution co-axial with the first half-shell, which slides in a cylinder and acts as an obturator by coming to bear against a seat formed by a shoulder in the bore of the chamber. This prior art discloses a guided valve designed for a high flow of fluid at low and high pressures. A disadvantage results from the second guiding half-shell which hinders the re-closure of the obturator when the flow is reversed. In addition, this type of guided valve is not desirable in an installation working at low pressure, not sealing perfectly, and taking too long to open.

The present invention aims at achieving an improved non-return valve in such a way as to ensure, at any pressure, good sealing conditions (closed position) or good flow of fluid (open position).

SUMMARY OF THE INVENTION

A non-return valve according to the invention comprises an obturator made up of a head fitted with a stem on the reverse side, so that this obturator is able to slide with double axial guidance in a cylindrical component located and held by screwing inside the bore of a single-piece chamber, with a shoulder which constitutes the seat of the obturator, characterised in that it comprises a cylindrical flexible seal in the shape of an L, this seal being pinched between the shoulder of the chamber and the end of the cylindrical component for the double guidance of the obturator. When the installation is operating at a low counter-pressure, the sealing of the valve is ensured by the elasticity of the flexible cylindrical lip of the L-shaped seal, this lip pressing against the obturator and taking its shape. When the installation is operating at high pressure, the obturator comes to bear against the chamber shoulder, the lateral walls of the obturator head slightly pressing apart the flexible edge of the L-shpaed seal which is then in contact, over its entire surface, with the obturator and the seat formed by the shoulder, so that this lipped flexible seal can resist any pressure.

According to another characteristic, the lipped flexible seal is entirely independent of the other components of the valve. At the same time it gives the same excellent sealing as a valve with a flexible membrane (closed position) without impeding the large output and the flow of fluid (open position) when the obturator is fully raised.

According to another characteristic, the guidance component for the obturator comprises at one end either a cylindrical wall threaded on its external face, or a smooth cylindrical wall for centering, with a means of locking the guidance component, and holding it pressed against the seat. When the cylindrical wall is threaded, it may be screwed on interior tapping provided near to the shoulder of the chamber. At the opposite axial end, there is a hub pierced by an axial bore, the hub and the cylindrical wall being linked by arms, of which at least part of the length is parallel to the axis of slide of the obturator, so that there is:

double guidance of the obturator, ensured on the one hand by the sliding of the reverse stem in the bore of the hub and, on the other hand, by the sliding of the lateral wall of the obturator head along the generating lines of the connecting arms;

a precise return of the obturator on to its seat, this return being ensured, whatever the position of the valve may be, by a return spring fitted around the reverse stem;

as limited as possible a reverse fairing, to decrease the loss of pressure in reverse flow and facilitate the instantaneous return of the obturator to its seat, hence reducing hammering.

According to another characteristic, the leading face of the obturator head is flat, the pressure being equally spread over all the operative surface so as to obtain an immediate and complete opening as soon as a small flow appears. Similarly, the return spring, the double guidance, and the shape of the obturator, are combined with a relatively short travel, ensuring a rapid closure which reduces hammer in the pipework.

According to another characteristic, the lateral wall of the obturator head has, for at least part of its length, the shape of a truncated cone, as likewise have the edges of the inlet choke of the chamber, this profile reducing angular edges in such a way as to reduce the loss of pressure and facilitate the flow of the fluid.

According to another characteristic, the reverse guide stem of the obturator has a cruciform cross-section which avoids the risk of tight spots during sliding in the hub of the cylindrical guide-piece, and contributes to dislodging any incrustation.

BRIEF DESCRIPTION OF THE DRAWING

The attached drawing, given by way of non-limiting example, will allow the characteristics of the addition to be better understood.

FIG. 1 is an axial section of a non-return valve according to the invention, the obturator being closed under low pressure.

FIG. 2 is an axial section of this valve, the obturator being open.

FIG. 3 is another axial section of the valve when the obturator is closed under high pressure.

FIG. 4 is a plan view of the guide-piece screwed to the chamber.

FIG. 5 is a sectional view of the obturator along the arrows V—V (FIG. 3).

FIG. 6 is a view showing the flow of fluid in the chamber when the valve is open.

FIG. 7 shows a second embodiment.

DESCRIPTION OF THE PREFERRED EMBODIMENTS

To clarify the description, the same reference numbers are used in all figures, where appropriate.

In FIGS. 1 to 3, the non-return valve is composed of a chamber 1 defining a bore 2 which is threaded in front of a shoulder 4.

The end of a guide component 30 is screwed into the thread 3 of the chamber. This part of component 30 is connected by axial arms such as 31 to the reverse hub 32 which is pierced at its center by a bore 16 co-axial with the axis 17 of the valve. (FIG. 4). The spaces 33 between the arms 31 constitute the ways for the flow of fluid between the two parts of the bore 2 separated by the shoulder 4, which constitutes the seat for a guided obturator 34.

An annular flexible seal 35 is positioned on the shoulder 4. This seal has a section in the shape of an L, the lips of which are pressed respectively by trapping between the seat 4 and the longitudinal end of the screwed cylindrical component 30 on the one hand, and on the other hand by deformation under the effect of the lateral wall 36 of the obturator head 37.

In the guide unit constituted by the part 30, the arms 31 and the hub 32, slides an obturating component 34 which comprises:

the obturating head 37 of which the leading face 38 is flat whilst its lateral wall 36 comprises at least in part a portion 36a in the shape of a truncated cone (FIGS. 1 to 3);

a central stem located on the reverse side and in the center of the head; this stem 39 is introduced into the bore 16, along which it slides, between a closed position of the obturator (FIGS. 1 or 3) and an open position (FIG. 2) along a relatively short axial path;

a compression spring 18 located between an annular boss 40 standing above the reverse face of the head 37 and a shoulder 16a formed in the bore 16, this spring being situated around the stem 39 (FIGS. 1 to 3).

According to a preferred construction, the guide stem 39 may have a cruciform transverse section. This shape facilitates the sliding of the obturator and avoids the risk of tight spots in the bore 16 (FIG. 5), by eliminating incrustations.

Finally, the lateral wall of the head 37 constitutes a surface of revolution of which the largest diameter is designed to be able to slide along the interior generating lines 31a of the arms of the guide assembly, whilst its conical part 36a can come to bear against and spread the axial lip 35a of the flexible seal 35.

The assembling and operation of the valve is as follows:

A. the short stem 39 of the obturator 34 having been fitted with its return spring 18, its reverse point is introduced into the bore 16 of the hub 32, forming a single component with the arms 31 and the threaded cylindrical part 30;

the radial lip of the seal is placed on the shoulder 4 of the chamber;

with the spring held compressed, the guide component is fixed to the single-piece chamber 1 by screwing into the thread 3;

when it is screwed fully home, the radial lip 35b of the lipped flexible seal is trapped between the shoulder 4 of the chamber and the forward end of the component 30.

The shoulder 4 and the lipped seal 35 then act as the seat for the obturator, allowing the advantages of the guided valve and the membrane valve to be combined.

B. It is known that if hydraulic pressure is brought to bear against the leading face 38 of the obturator 34, the obturating head 37 lifts from the seat and from the seal when it is subject to a force greater than that of the return spring 18.

The axial lip 35a of the seal allows three possible positions of the obturator, owing to its own elasticity;

a. the pressure of fluid on the flat fact 38 is only slightly superior to the return force of the spring 18. The head 37 is lifted from the shoulder 4 of the chamber, but the valve remains completely sealed owing to the conjunction of the flexible lip 35a and the lateral wall 36. The valve operates like a membrane valve. It may be used in installations working at low pressure and needing very sensitive sealing components (FIG. 1).

b. as soon as the fluid pressure increases above a value set by the strength of the spring 18, the valve opens so that the substantially planar rear edge of obturator head 37 abuts the forward surface of hub 32 (FIG. 2). The fluid can then escape into the upper space 2 of the chamber. The flow through the chamber 1 is illustrated in FIG. 6. It will be noted that the curving profile of the choke 41, the curved truncated-cone shape of the lateral wall 36 of the obturator as well as the large space between the arms 31 of the guide component assist the flow as shown by the arrows 42, whilst reducing the loss of pressure in the chamber.

c. when the installation operates with high back pressure, the obturating head 37 bears down when the valve is closed (FIG. 3). The flexible lip of the seal is pushed back by the lateral wall 36 and comes to rest firmly against the head, improving the sealing. In this case, the two lips of the seal are supported, so that the flexible seat can bear any pressure whatever without damage.

The main advantages of the present invention are as follows:

the valve gives good sealing at both low and high pressures;

the double guidance of the stem 39 and the head 37 of the obturator prevent the jamming of the moving assembly which can operate in any position;

the immediate and complete opening or closing of the valve ensure a silent, reliable operation without vibration and an appreciable reduction in hammering;

the relative position of the components, their shape and the choice of materials prevent any jamming through the appearance of tight spots.

There is shown in FIG. 7 a variant in which the thread 3 in the chamber has been replaced by a smooth cylindrical part 53, in which is located a corresponding smooth part of the component of revolution 30. The component 30 is held in place by locking with radial screws 54. This fixing in place may be obtained by any mechanical means (a clip, key, etc.) or even by a simple adhesive.

I claim:

1. A non-return valve, comprising:

a one-piece metal chamber;

an obturator disposed within said chamber;

said obturator having an obturating head and a reverse axial stem;

an obturator guide member disposed within said chamber for axially guiding said obturator at said head and said stem;

said chamber being provided with an internal shoulder;

an L-shaped flexible and elastic annular seal member having a radially-extending annular lip thereof retained between at least a portion of said shoulder and said guide member, and a substantially axially-extending lip thereof disposed adjacent to an inner wall of said obturator guide member;

said guide member having a forward end portion and a rear end portion distal to said forward end portion;

said forward end portion being disposed adjacent to said shoulder;

said rear end being connected to said forward end by a plurality of arms;

each said arm having a substatially straight portion adjacent said forward end portion and a curved portion adjacent said rear end;

a hub having a bore therethrough disposed at said rear end and connected to said arms for guiding said reverse axial stem;

the inner surfaces of said straight portions of said arms forming a bore for guiding said obturator head;

said curved portions of said arms forming a rear fairing to facilitate the flow of a fluid through said non-return valve;

a return spring disposed co-axially around said reverse axial stem between said hub and said obturator head for pressing said obturator head towards said shoulder; said obturator head having a forward peripheral surface defining a leading face from which extends a curved lateral wall portion being curved so as to define a substantially axially-extending portion thereof and wherein a portion of said curved lateral wall sealingly bears against said axially-extending lip of said seal member in the closed position of said valve.

2. A non-return valve according to claim 1, wherein: said axially extending annular lip and said obturator head are compelled to become adjacent and touching at all points upon an edge of said axially extending annular lip when a differential back pressure of 3 cm of water is applied on opposite sides of said obturator head.

3. A non-return valve according to claim 2, wherein: said obturator is made from a light material; and said obturator head having a substantially flat surface upon at least a portion of a surface thereof distal to said reverse axial stem.

4. A non-return valve according to claim 1, wherein: said axially extending annular lip and said obturator head are compelled to become adjacent and contiguous over a substantial portion of said axially extending annular lip when a differential back pressure of 10 bars is applied on opposite sides of said obturator head; and said axially extending annular lip being disposed between at least portions of said shoulder and said obturator head.

5. A non-return valve according to claim 4, wherein: said obturator is made from a light material; and said obturator head having a substantially flat surface upon at least a portion of a surface thereof distal to said reverse axial stem.

6. A non-return valve according to claim 1, wherein: said obturator is made from a light material; and said obturator head having a substantially flat surface upon at least a portion of a surface thereof distal to said reverse axial stem.

7. A non-return valve according to claim 1, wherein: said reverse axial stem of said obturator has a cruciform transverse section to make said stem and obturator guide member self cleaning when said stem slides within said guide member.

8. A non-return valve according to claim 1, wherein: said obturator guide member includes, at one end thereof, a smooth cylindrical centering wall for centering said obturator guide member within said chamber; and further includes means for locking said guide member in said chamber adjacent said shoulder.

9. A non-return valve according to claim 1, wherein: said guide member is retained within said chamber against said shoulder of said chamber by separate mechanical fastening members.

10. A non-return valve according to claim 1, wherein: mating threads are provided in said chamber adjacent said shoulder and upon said guide member at one end thereof for retaining said guide member in said chamber.

11. A non-return valve according to claim 1, wherein: said obturator head forward peripheral surface includes a substantially flat central portion defining said leading face; and said substantially axially-extending portion of said curved lateral wall portion includes a substantially planar rear edge of said obturator head, said planar rear edge abutting the forward surface of said hub in the open position of said valve.

12. A non-return valve according to claim 11, wherein:

said curved lateral wall bears against said axially-extending lip of said seal member such that said axially-extending lip sealingly follows the contour of said curved lateral wall, when said valve is operating under high back pressure conditions.

* * * * *